Figure 1:
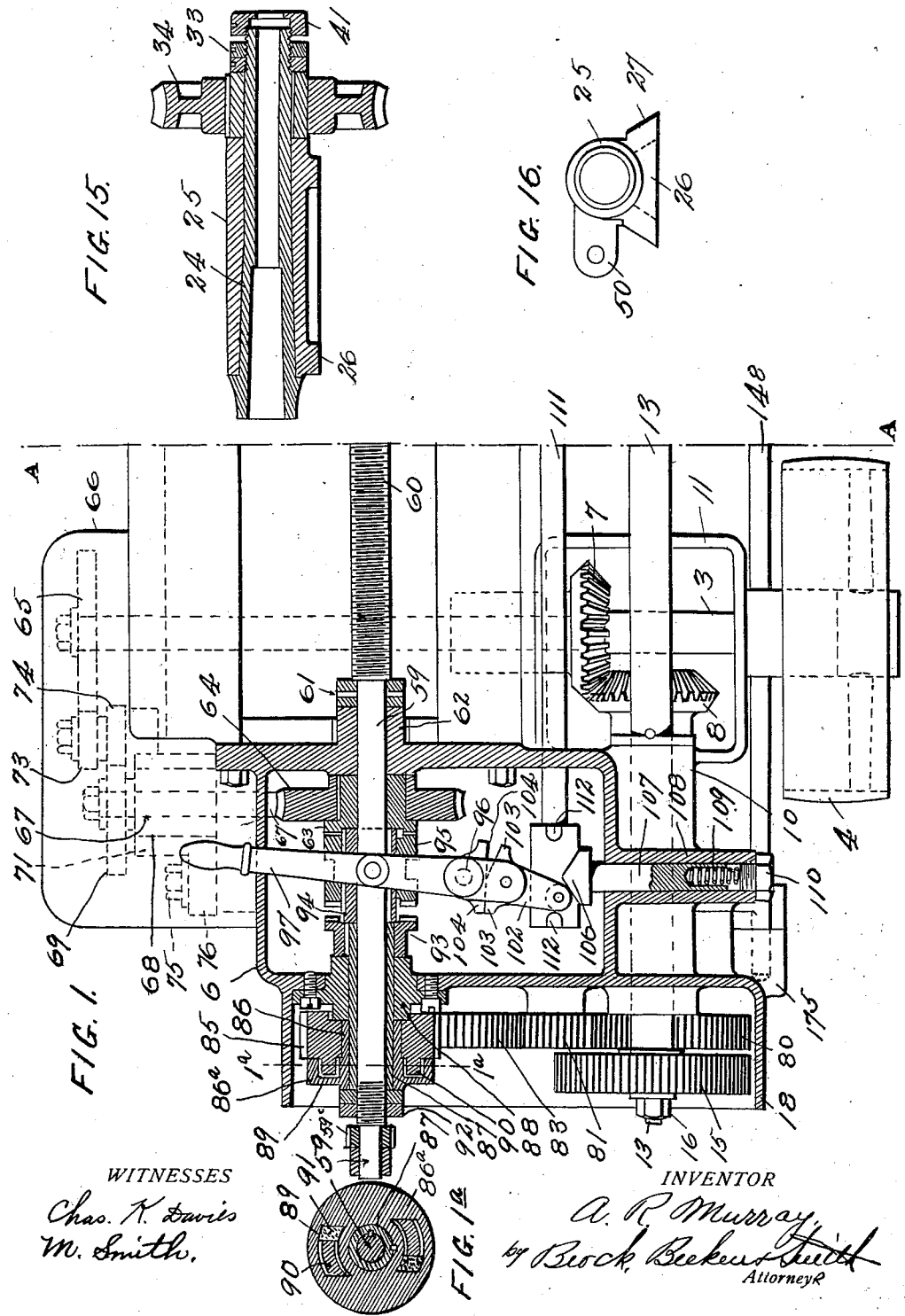

A. R. MURRAY.
GEAR CUTTER.
APPLICATION FILED JUNE 27, 1907.

1,007,376.

Patented Oct. 31, 1911.
11 SHEETS—SHEET 1.

A. R. MURRAY.
GEAR CUTTER.
APPLICATION FILED JUNE 27, 1907.
1,007,376.
Patented Oct. 31, 1911.
11 SHEETS—SHEET 9.
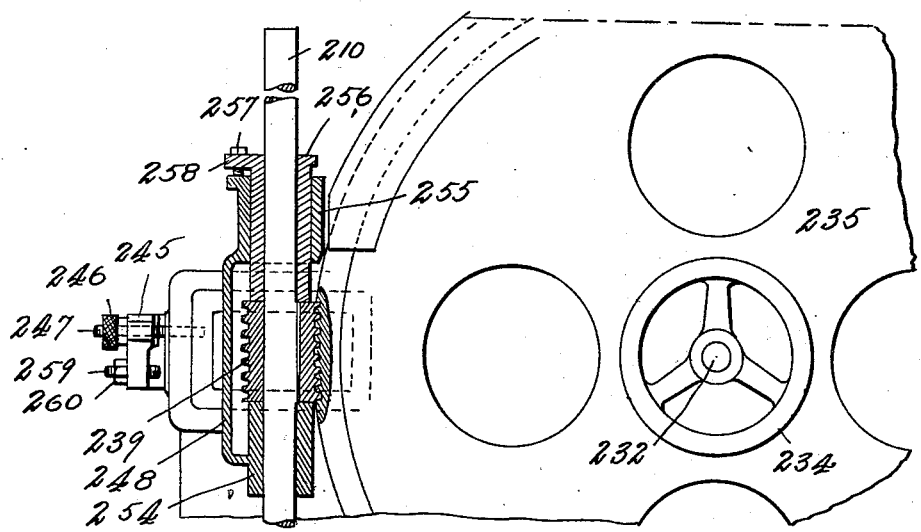
FIG. 9.
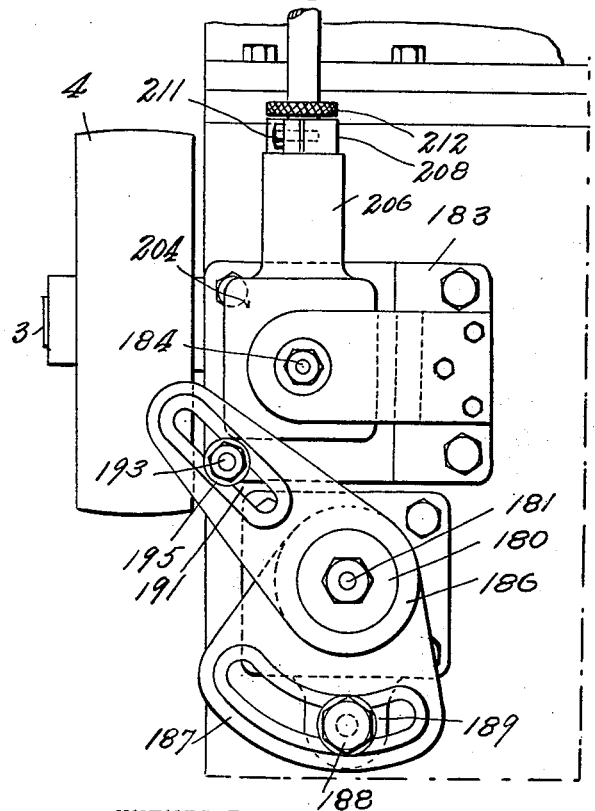
WITNESSES
Chas. K. Davies.
M. Smith
INVENTOR
A. R. Murray,
by Brock, Becker & Smith
Attorneys
COLUMBIA PLANOGRAPH CO., WASHINGTON, D. C.

A. R. MURRAY.
GEAR CUTTER.
APPLICATION FILED JUNE 27, 1907.
1,007,376.
Patented Oct. 31, 1911.
11 SHEETS—SHEET 10.
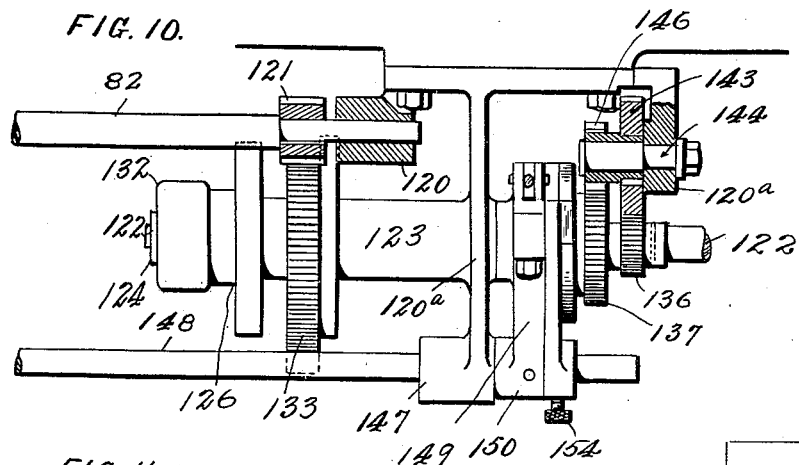
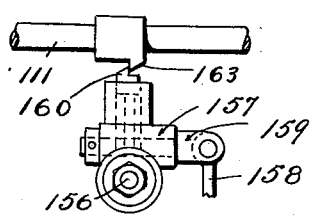
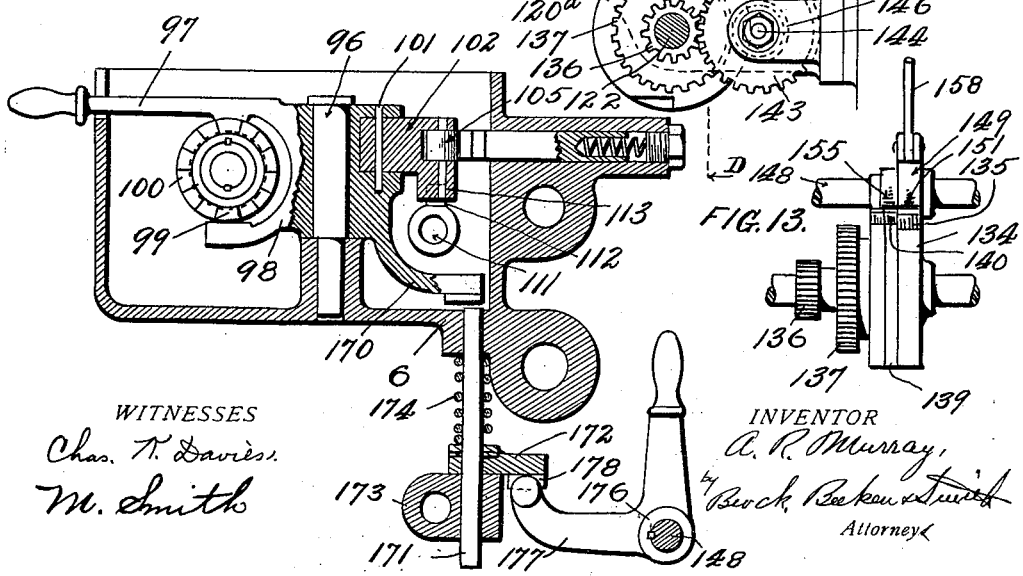
WITNESSES
Chas. N. Davies.
M. Smith
INVENTOR
A. R. Murray,
by Buck, Beeken & Smith
Attorneys

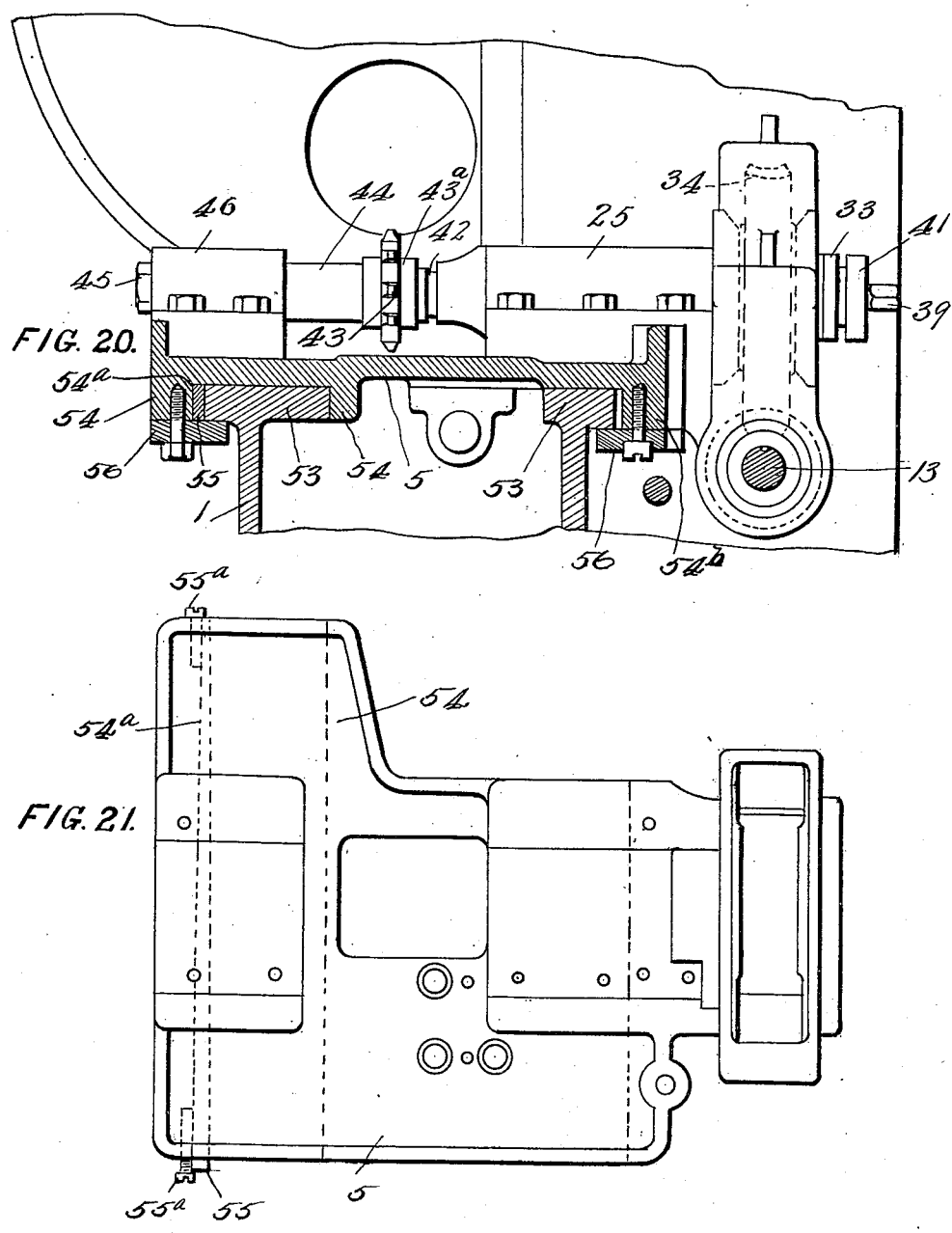

UNITED STATES PATENT OFFICE.

ARISTIDES REYNOLDS MURRAY, OF CINCINNATI, OHIO, ASSIGNOR TO THE CINCINNATI SHAPER CO., OF CINCINNATI, OHIO.

GEAR-CUTTER.

1,007,376.                    Specification of Letters Patent.    Patented Oct. 31, 1911.

Application filed June 27, 1907. Serial No. 381,032.

*To all whom it may concern:*

Be it known that I, ARISTIDES REYNOLDS MURRAY, a citizen of the United States, residing at Cincinnati, in the county of Hamilton and State of Ohio, have invented new and useful Improvements in Gear-Cutters, of which the following is a specification.

The invention relates to gear cutters and especially to automatic machines for cutting spur gears. Many of the features of the machine are however adapted for use in cutting other forms of gears, and also in milling machines not intended especially for gear-cutting, and in other machine tools, as will be understood by those versed in the art.

Among the objects of the invention are to provide a simplified arrangement of shafts and gears for driving the various parts of the machine; to provide readily accessible groups of gearing for the cutter-feed and index mechanism; to provide means for readily changing the gear ratio at these points; to provide in the indexing mechanism readily adjustable means for controlling the movement of the blank in indexing without disturbing the main blank-rotating gearing; to provide a novel form of feed-controlling lever, and a new and very positive safety-stop coacting with the indexing mechanism and feed lever.

The invention further consists in new and improved construction throughout the machine, as will later appear.

The drawing illustrates the best exemplification of the invention which I have at this time devised, but it is to be understood that other exemplifications are contemplated within the scope of the invention.

Figure 2:
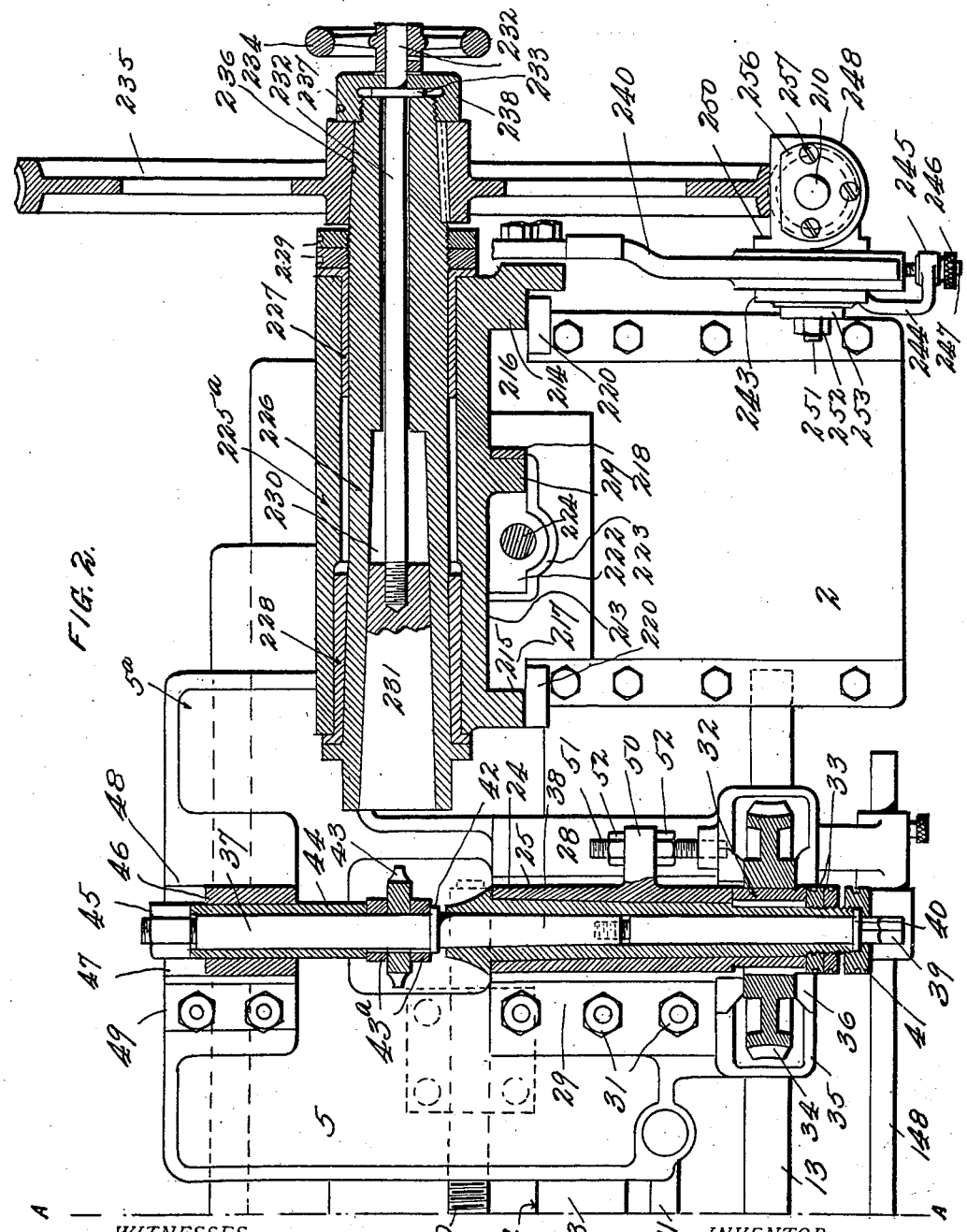
Figure 3:
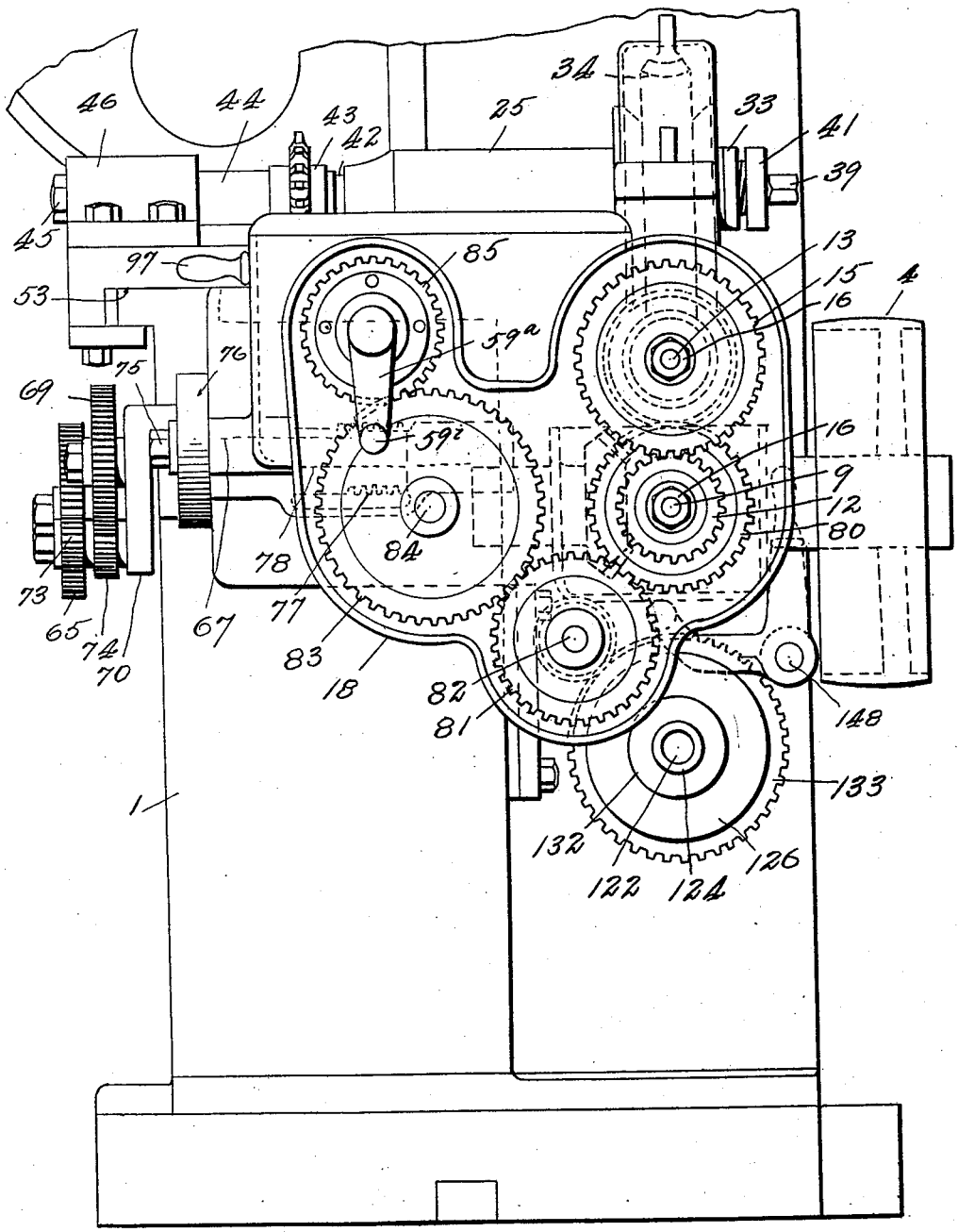
Figure 4:
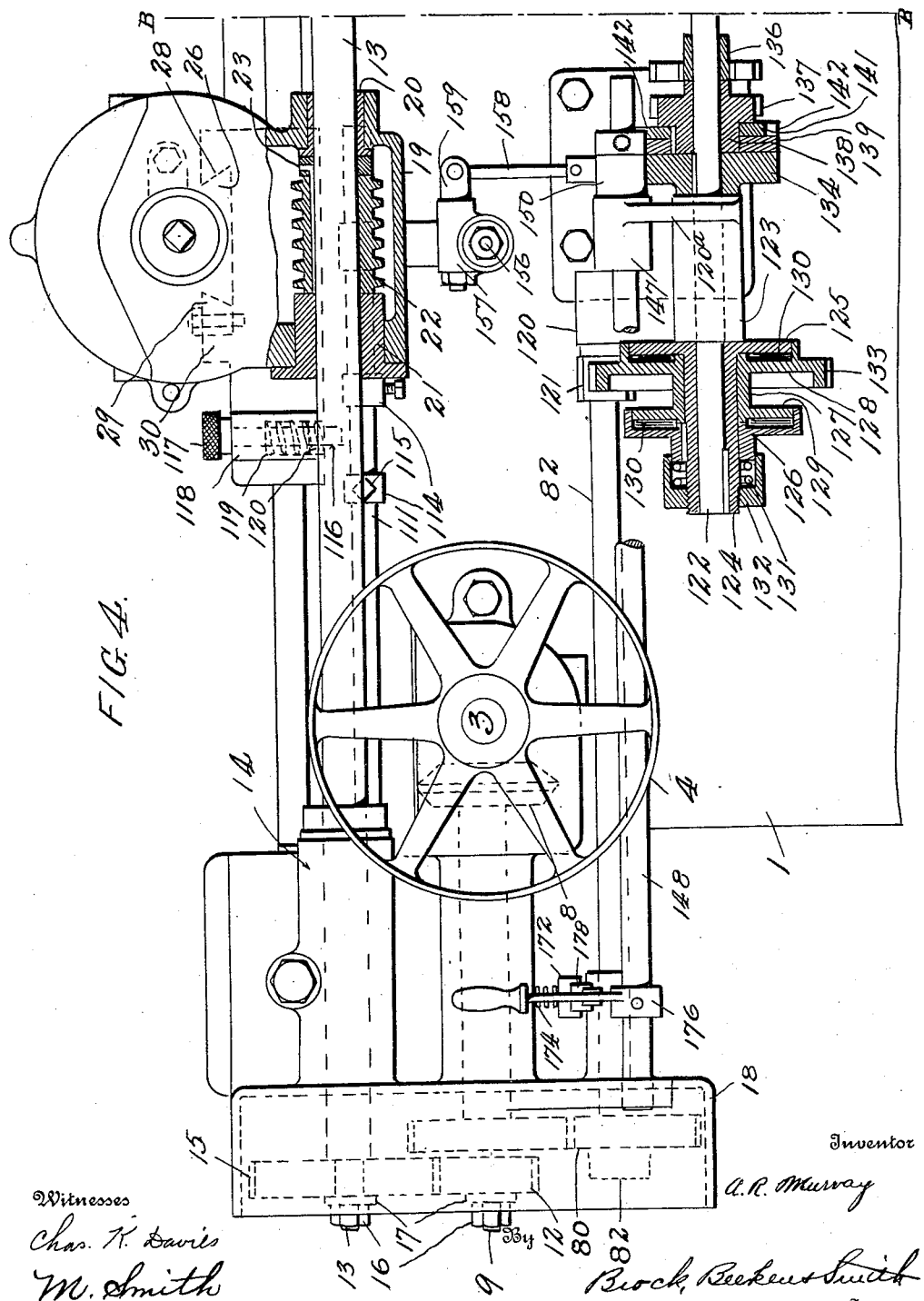
Figure 5:
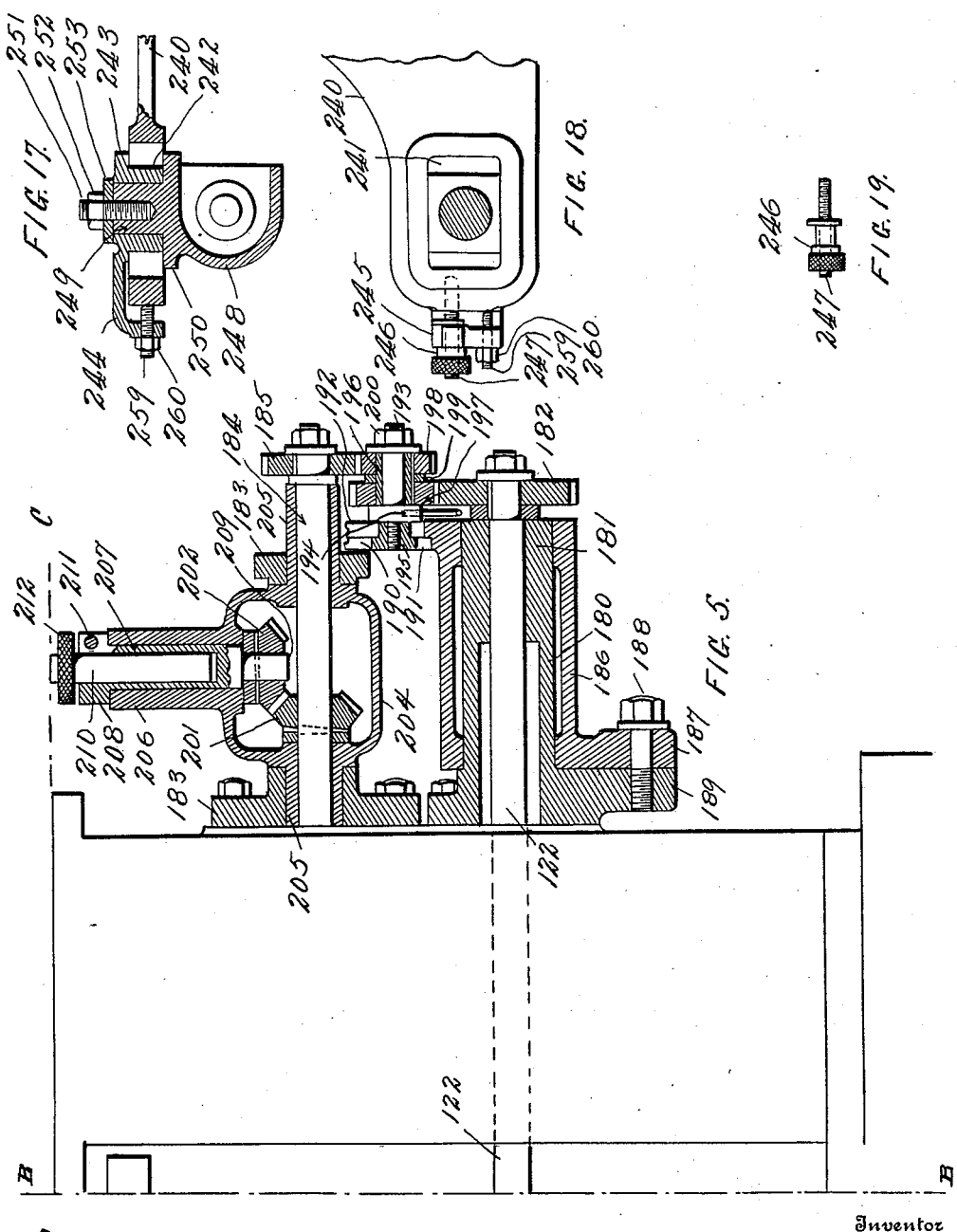
Figure 6:
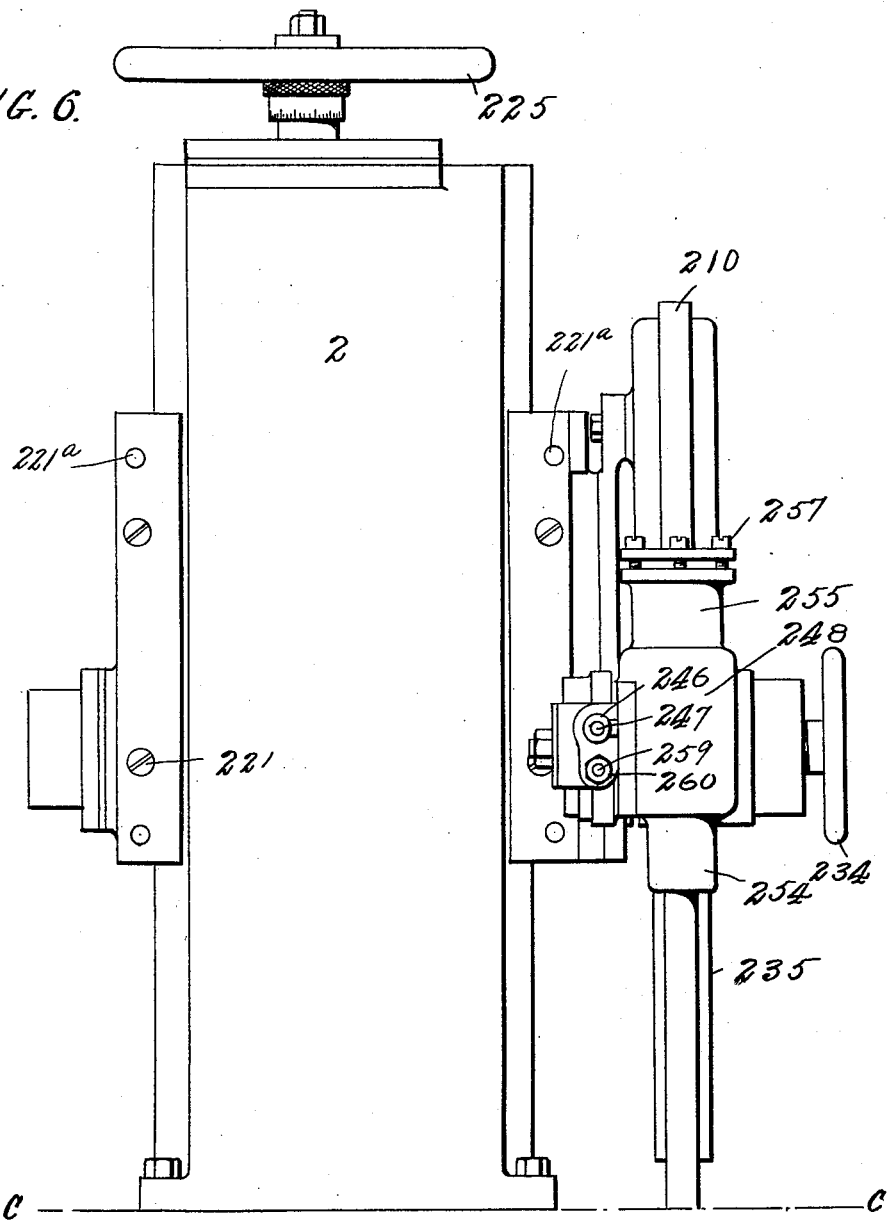
Figure 7:
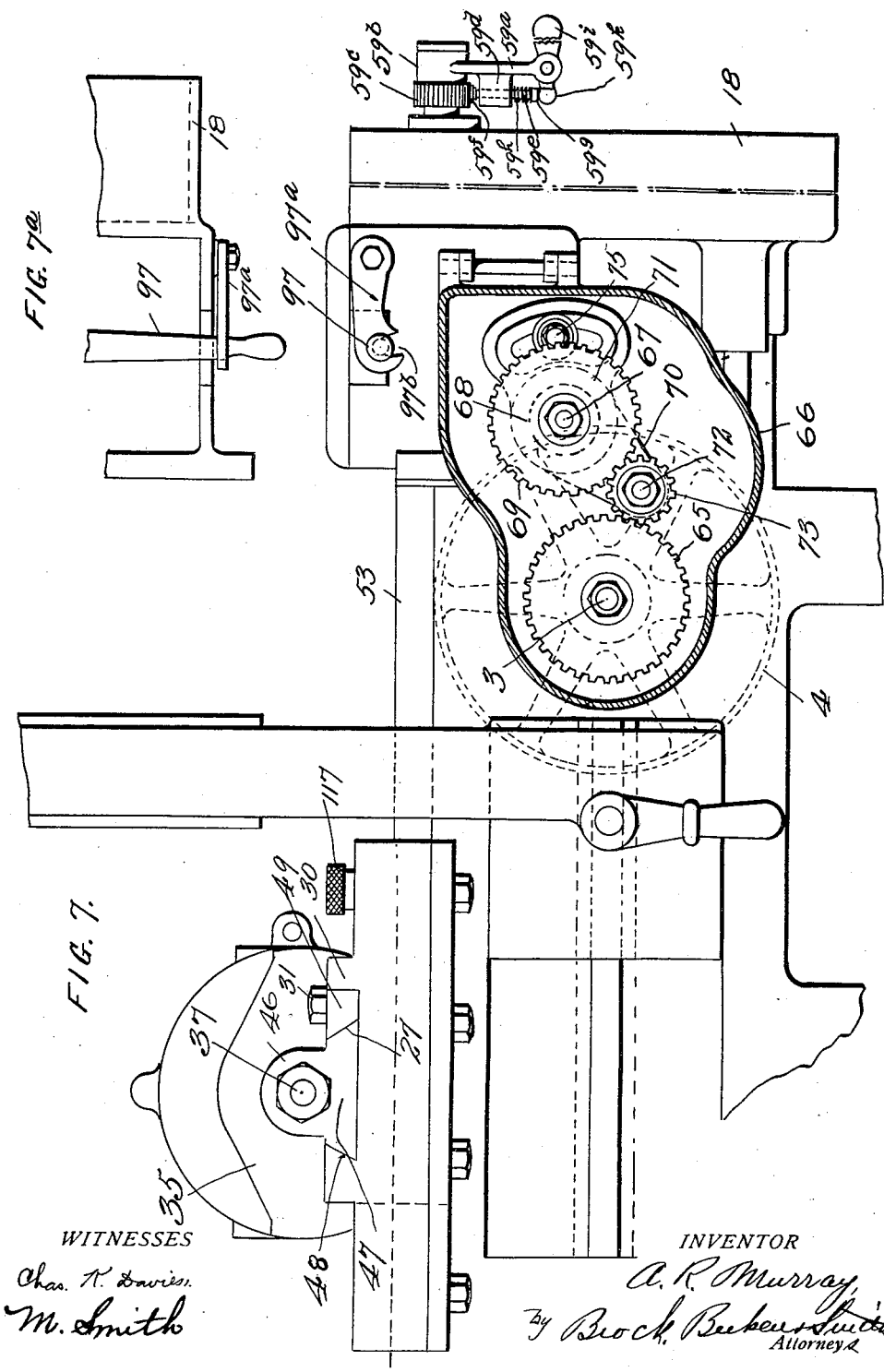
Figure 8:
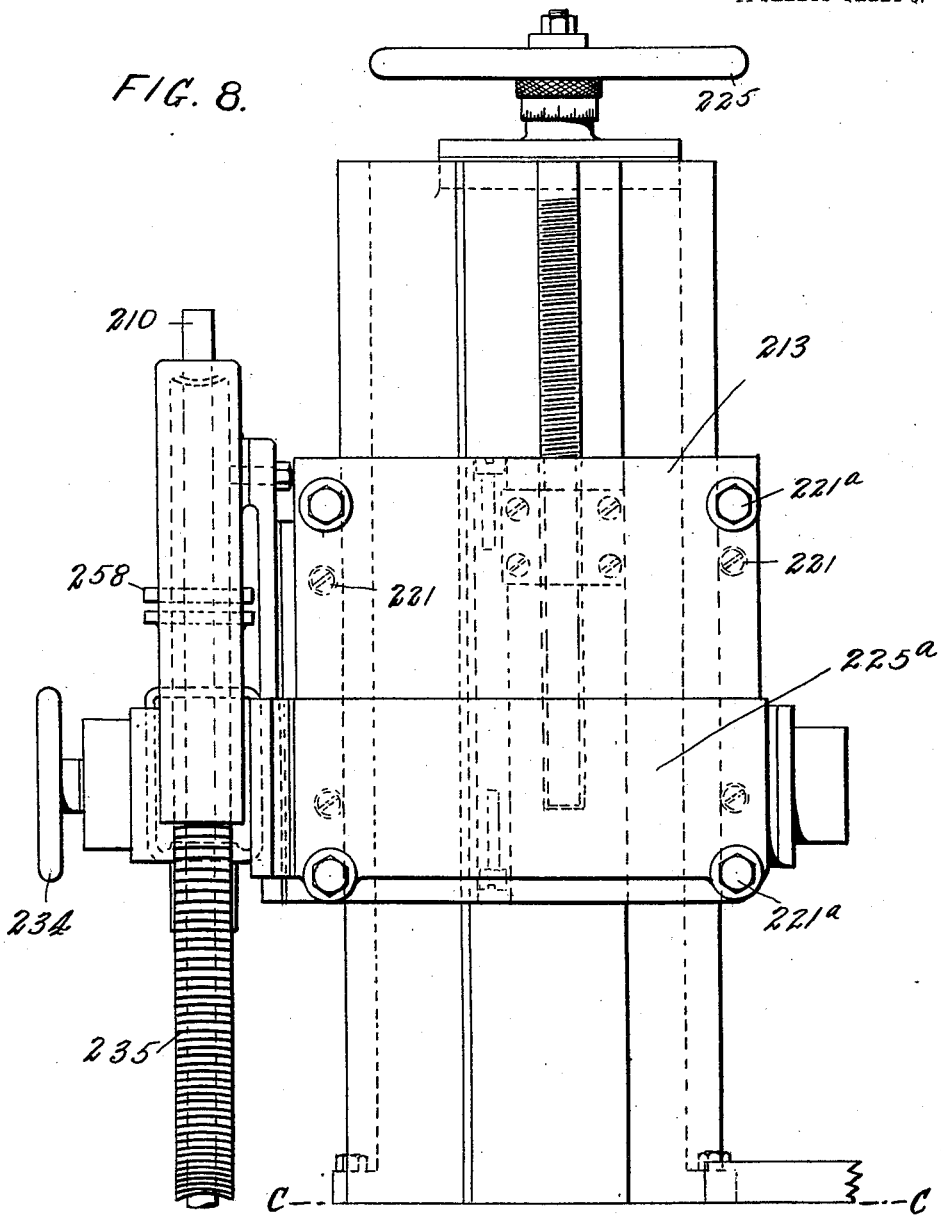

Figures 1 and 2 join on the line A—A, and constitute a view, partly in plan and partly in section, of a machine embodying the invention, Fig. 1 showing the forward or feed end of the machine, and Fig. 2 the rear end. Fig. 1ᵃ is a detail in section on the line 1ᵃ 1ᵃ, Fig. 1. Fig. 3 is a front end elevation, the upper part of the blank column being omitted. Figs. 4, 5 and 6, of which Figs. 4 and 5 join on the line B—B (the lines identified by literal characters designating planes which are the same in all views), and Figs. 5 and 6 join on the line C—C, together constitute a complete right-hand view of the machine, partly in elevation and partly in section, Fig. 4 being the front end, Fig. 5 the rear end, and Fig. 6 the blank pillar. Fig. 7 is a left side view, principally in elevation, but partly in section, of that part of the machine forward of the blank column; Fig. 7ᵃ a detail in plan of the reversing lever and latch therefor; Fig. 8 a left side elevation of the blank column; Fig. 9 a condensed rear view, principally in elevation, but partly in section, showing the upper and lower parts of the machine brought close together, the splined worm-shaft being broken for that purpose; Fig. 10 a plan view of the index and stop mechanism; Fig. 11 a side elevation of the same; Fig. 12 a rear view of the same, partly in section; Fig. 13 a view from the left on plane D—D, Fig. 12; Fig. 14 a front sectional diagrammatic view of the reversing lever and safety-stop; Fig. 15 a section longitudinally through the cutter spindle; Fig. 16 an end view of Fig. 15, showing the transverse cutter carrier; Fig. 17 a detail in section looking downward of the movable support for holding the index worm in engagement with the worm-wheel; Fig. 18 a view of the mechanism of Fig. 17, taken from the left side of the machine; Fig. 19 a detail of a part of the worm-adjusting mechanism; Fig. 20 a transverse section through the base and cutter slide showing the guides; and Fig. 21 a plan of the slide with the cutter, cutter arbor, spindle, etc., removed showing the adjustable gib.

*General arrangement.*—Reference numeral 1 designates the base of the machine which carries at the rear end a column 2 supporting the blank arbor. Shaft 3 reaches across the machine near the front end and is suitably journaled in the frame. Pulley 4 keyed to shaft 3 at the right hand side of the machine furnishes the power drive for the whole mechanism. The cutter-slide 5 is mounted on suitable guides to move longitudinally of the frame. Near the front or feed end a box 6 is secured to the base which incloses the feed clutches and reversing lever.

Words indicating position, such as "horizontal," "vertical," etc., are used in a relative sense only. By defining definite positional relations of parts in the exemplification shown and described it is not intended to limit construction to such arrangements. Changes in position of parts as well as other changes, may be made without departing from the invention. Words denoting direction, as "front," "rear," right-hand," etc., are used with reference to a supposed observer standing at the feed end of the machine.

*Cutter, slide and cutter drive.*—Main shaft 3 carries a bevel gear 7 engaging bevel gear 8 keyed to shaft 9 which is journaled in sleeve 10 carried by the base. Gears 7, 8, are inclosed in a gear box 11 formed in the base which may be open at the top or covered. A pinion 12 is secured to the shaft 9 at the front end. Cutter drive shaft 13 is journaled at its forward end in sleeve 14 above shaft 9 and carries gear 15 engaging pinion 12. Pinion 12 and gear 15 are keyed to their respective shafts and secured by nuts 16 and washers 17 so that they may be removed and replaced by other sized gears to change the relative speeds of shafts 9 and 13. Gears 12 and 15 as well as other gears at the feed end of the machine are inclosed by guard 18 surrounding the peripheries of the various gears.

The rear end of shaft 13 revolves in bearings formed in a housing 19 fixed to the cutter slide. The rear bearing 20 consists of a bush fixed in the housing and the forward bearing 21 is a removable bush having an outside diameter equal to that of the worm and screwed or otherwise suitably secured in the housing. The worm 22 is mounted and splined on shaft 13 between bearings 20, 21, so that it is free to move longitudinally on the shaft as the slide reciprocates but turns with the angular movement of the shaft. A thrust collar 23 is interposed between the worm and the rear bearing member 20 to take up the thrust of the worm.

The hollow cutter spindle 24 is revolubly mounted transversely of the machine and above shaft 13 in sleeve 25. The sleeve is operatively integral with a base 26 having beveled edges 27 and the sleeve with its base forms a slide movable transversely on the cutter slide proper. The beveled base rests on a flat face of the cutter slide between a fixed guide 28 and movable gib 29 which rests between a transverse shoulder 30 on the cutter slide and transverse slide 26. Screws 31 serve to tighten or loosen the movable gib and so to secure or free the transverse slide. Spindle 24 bears near its right hand end a collar 32 splined to it and is tapered at its left hand end to fit a corresponding taper in sleeve 25. By means of nuts 33 engaging a screw thread on the spindle and bearing against collar 32 the spindle may be drawn to the right in relation to sleeve 25 to take up wear. Worm wheel 34 engaging worm 22 is splined to collar 32 so as to have slight longitudinal movement thereon and is carried in a housing 35, fixed in relation to the cutter slide, with its hub between annular or partly-annular shoulders 36 formed in the housing which serve to hold the worm wheel stationary on the slide except for its rotary motion.

Cutter arbor 37 has a tapered right hand end 38 fitting in the tapered portion of the bore of spindle 24 and is secured to the spindle by bolt 39, whose flange 40 engages the end of the spindle, and lock nut 41 screwed on the end of the spindle and engaging flange 40. Arbor 38 carries a flange 42 and a cutter 43 is mounted and splined on the arbor adjacent to the flange. The rough adjustment of the cutter is effected by placing one or more collars 43ª of suitable sizes between it and the flange, and if necessary on the other side of the cutter, these collars and the cutter being forced together and against the flange by sleeve 44 surrounding the arbor and engaged by nut 45 screwed upon the left end of the arbor. The left end of the arbor is supported, if necessary, by a bearing 46 carried on a transverse slide 47 which may be similar to slide 26, already described, and similarly secured by a guide 48, and gibs 49, and other parts respectively similar to members numbered 28, 29, etc., already described in connection with slide 26. By loosening gib 49, slide 47 may be removed from the cutter slide, permitting the removal of the cutter and related parts.

The fine adjustment of the cutter is effected as follows: The transverse slide 26 carries a lug 50 through which screw 51 secured to housing 35 passes loosely. Nuts 52, one on each side of the lug, engage the screw and by turning the nuts sleeve 25, the spindle and arbor 37 with the cutter are moved bodily to the right or left, this movement being permitted by the splined connection of collar 32 with the hub of worm wheel 34. When the adjustment of the cutter has been effected, screws 31 are tightened, forcing movable gib 29 against transverse slide 26, and locking it in position.

The top of the main frame or base is provided with two guide rails 53 (see Figs. 20 and 21) having vertical surfaces for guiding the cutter slide. The left-hand rail guides the slide laterally. At the left side the slide has two longitudinal flanges 54, embracing the left-hand rail. Surface 54ª of one of the flanges is at a slight angle to the longitudinal axis of the slide and adjustable tapered gib 55 is carried between this surface and the guide rail. The gib is adjusted in relation to the slide by screws 55ª engaging the slide and whose heads engage the ends of the gib. By this means the gib is adjusted so as to make a close sliding fit between the guide rail and the flanges. At its right-hand edge the slide has another longitudinal flange 54ᵇ between which and the adjacent guide rail a clearance is provided. Clamps 56 bolted to flanges 54, 54ᵇ engage the under sides of the guide rail and prevent the slide from rising.

The peculiar L-shape of the slide is important. It permits making the left-hand side of the slide, the rear end of which moves to the rear of the work column, very long, with long guiding surfaces. The right-hand side is shorter so that it does not encounter the column. This construction allows a great travel of the cutter slide on a relatively short base and also provides a narrow guide of great length, reducing the binding tendency of the slide to a minimum.

*Cutter feed, gearing and clutch.*—Feed shaft 59 passes through feed box 6 and is journaled in suitable bearings in the front and rear of the box, and bears the feed screw, 60, which engages a nut secured to the bottom of the cutter slide. A collar 61 pinned to the feed shaft engages shaft bearing 62 and takes up the feed thrust of the screw. Forward of bearing 62 feed-clutch 63 is revolubly mounted on shaft 59 and the cutter-feed worm-wheel 64 is keyed on this clutch.

At its left hand end main shaft 3 carries gear 65 outside the base, inclosed by a guard 66 which also incloses other gears belonging to the feed drive. Transverse shaft 67 passes through the feed box and projects therefrom at the left through an extended cylindrical bearing 68 and at its outer end carries gear 69. A quadrant 70 having its hub 71 pivotally mounted on the projecting bearing 68 bears a stud 72 carrying double pinions 73, 74, the first engaging gear 65 and the second, gear 69 so that the transverse shaft 67 is driven from main shaft 3 through gears 65, 73, 74, 69. By removing double pinions 75, 74 and gear 65 and replacing these with gears and pinions of different sizes the ratio of speed of shaft 67 to that of shaft 3 may be varied. Quadrant 70 is swung on bearing member 68 as a pivot to bring pinion 73 into proper mesh with whatever size gear 65 is used and locked in adjusted position by means of nut 75 engaging slotted segment 76 of the quadrant. Transverse shaft 67 is suitably journaled in the base and passes through the feed box below the feed worm-wheel. The feed worm 77 engages the worm wheel and is keyed on shaft 67 between stationary bearing members, which restrain the worm from end motion.

Shaft 9, which, as above described, is driven from the main shaft, bears a gear 80 engaging gear 81 on index drive shaft 82; gear 81 in turn engages idle gear 83 on stud 84 and gear 83 engages gear 85 which is the driving gear for retracting the cutter. Gear 85 is mounted revolubly upon a flanged collar 86 keyed to sleeve 87, which is revoluble on the rear end of the feed shaft 59 and in turn revolves within the forward bearing member 88 of said shaft. Flange 86ᵃ of collar 86 has one or more sockets 89 into which project lugs 90 of corresponding number, carried by gear 85. Interposed between the lugs and the adjacent faces of sockets 89 in the direction of drive are elastic fillers 91, conveniently of raw hide, which deaden the shock of engagement of the reverse feed drive which would otherwise be considerable, owing to the relatively high gear ratio at which the cutter is retracted from the work. Near its front end feed shaft 59 is screw-threaded, and nuts 92 engaging the thread bear against collar 86 serving to draw the shaft to the left in relation to the collar. This urges the collar into engagement with the desired closeness with the forward face of bearing 88 and at the same time draws thrust collar 61 against the rear face of bearing 62. Collar 86 and nuts 92 thus take up the thrust of the feed screw during the retracting movement.

Sleeve 87, as has been said, extends through bearing 88, and to the rear of the bearing reverse clutch member 93 is keyed to it. Between forward clutch member 63 and reverse clutch member 93 a sleeve 94 is keyed to shaft 59 and on this sleeve is splined the double reversing clutch member 95, having teeth at each end to engage the teeth of clutch members 63 and 96. When the reverse clutch is in position shown in Fig. 1, that is, in engagement with clutch member 63, the feed worm wheel 64 is evidently connected revolubly with the feed screw, and when the reversing clutch 95 is in its rearward position engaging clutch member 93, reverse gear 85 is connected revolubly with the feed screw.

The operation of the gearing for forward and reverse feed is obvious from the foregoing description of relation of the parts.

*Field clutch operating mechanism,* (referring to Figs. 1, 4, 10 and 14.)—Pivoted on a stud 96 in the feed box is the reversing lever 97, forked at 98 to embrace the reversing clutch, and having fingers or rollers 99 engaging an annular groove 100 in the clutch. Pivoted to lever 97 at 101 is a rocking lever 102 called, for convenience, simply a "rocker", having projections 103 adapted to engage corresponding projections 104 on the reversing lever to stop relative movement of the rocker in relation to the lever at the proper points. At its end away from the reversing lever, rocker 102 carries a roller 105 constituting a cam-follower engaging the centrally peaked cam 106. This cam is carried by a plunger 107 reciprocating in a socket 108 and pressed outwardly by a spring 109 confined in the socket by a cap-screw 110. To retain the reversing clutch in an intermediate position and free from either the forward or reverse feed clutch members a latch 97ª is pivoted to the left side of the feed box 6. The latch is provided with a hook 97ᵇ adapted to engage lever 97 as shown in Figs. 7 and 7ª.

Mounted reciprocably in suitable bearings below the rocker and cutter slide is a reversing rod or clutch shifter 111 which carries upwardly projecting lugs 112 separated a suitable distance, one on each side of a lug 113 depending from rocker 102. Rod 111 carries two dogs 114 adjustable on the rod by means of screws 115 within the range of movement of the cutter slide and the slide carries a tappet 116 moving between dogs 114. The tappet extends through a socket in the slide and is provided at the top with a knurled head 117 carrying a pin 118 projecting downwardly into a hole drilled in the slide to receive it. A spring 119 surrounding the tappet within its socket and bearing against flange 120 on the tappet urges the latter downward. By pulling up and rotating the knurled head 117, pin 118 is brought into contact with the surface of the slide and the tappet is thus held in inoperative position away from dogs 114 so that, for instance, when the machine is being adjusted the slide may be moved without affecting the position of the reversing lever, or shifting the dogs.

Ordinarily, with the tappet in working position, when it encounters either of the dogs, it moves the dog and rod 111 in the direction of movement of the slide. Assuming the parts to be in the position shown in Fig. 1, that is with the reversing clutch in engagement with the feed clutch member 63 and the slide moving toward the rear of the machine, reversing rod 111 is moved to the rear causing forward lug 112 carried by the rod to encounter lug 113 on the rocker. The continued movement of the slide causes the rocker to move toward the right as seen in Fig. 1 until cam follower 105 passes the crest of dog 106. Leaving out of consideration at present the safety stop, which will be later described, the cam, urged by spring 109, now moves the follower farther to the right until abutment 103 of the rocker encounters corresponding abutment 104 on the reversing lever and rotates the reversing lever anti-clockwise on its pivot, retracting the reversing clutch 95 from feed clutch member 63, thus stopping the feed, and by continued movement bringing the reversing clutch into engagement with clutch member 93, making the reverse feed effective and retracting the cutter from the work.

*Indexing mechanism,* (referring to Figs. 4 and 10 to 13.)—As has been described, gear 81 is driven by gear 80 on shaft 9 and rotates shaft 82, which has its forward bearing in gear box 18 and extends alongside the base of the machine to rear bearing 120. Near the bearing the shaft bears the pinion 121. Rear or driven indexing shaft 122 is mounted in its forward end in bearing 123, carried by a bracket 120ª secured to the base, and carries a sleeve 124 keyed to it. The sleeve has an annular flange 125 at its rear end, and a flanged sleeve 126 is splined to sleeve 124 near its forward end so that it has longitudinal movement. A sleeve 127 is mounted revolubly on sleeve 124 between flanges 125 and 126 and constitutes the driving member of the friction drive. Sleeve 127 carries flanges 128, 129, facing flanges 125, 126, respectively, and friction disks, 130, of leather, raw hide or other suitable material are placed between the driving and driven disks. Spring 131 confined between adjustable nut 132 and the end of the sleeve of disk 126 applies suitable pressure to the frictionally driven member. Disk 128 carries a gear 133 engaging pinion 121 by which the driving member of the friction group is rotated. To the rear of bearing 123, fast stop-disk 134 is keyed to shaft 122. This disk is provided with one or more notches 135 as may be required, one being used in the present exemplification. A little to the rear of disk 134, pinion 136 is keyed to shaft 122 and between the pinion and the disk a loose gear 137 having an extended hub 138, is journaled on the shaft. Keyed to this hub between gear 137 and the fast stop-disk 134 are a first loose stop disk 139 having in the present exemplification one notch 140, and a second loose stop-disk 141 having in this exemplification two notches 142. Pinion 136 engages a larger gear 143 revoluble about a stud 144, which is equivalent to a counter-shaft, carried by an extension of bracket 120ª secured to the base and gear 143 is keyed to the hub of smaller pinion 146 which in turn engages gear 137 on shaft 122, serving to drive the last-named gear and stop disks 139, 141 keyed to it at a reduced speed in relation to that of shaft 122. To the right of shaft 122 a continuation of bracket 120ª provides a rear bearing 147 for rock shaft 148, sometimes called the "latch shaft." This shaft carries fixed latch 149, whose hub 150 is keyed to the rock shaft and which has a tooth 151 adapted to enter notch 135 in fast stop-disk 134. To the rear of fixed latch 149 is a movable latch 152, of which the hub 153 is mounted on rock shaft 148 and splined thereto in the same plane as latch 149 so that it has longitudinal movement on the shaft. A set screw 154, with knurled head, serves to lock latch 152 in adjusted position on its shaft. Latch 152 has a tooth 155 adapted to enter the notches in loose stop disks 139, 141, depending on the position of the latch. Rock shaft 148 is urged to rotate in a clockwise direction as seen in Fig. 12, and thus urges the teeth 151, 155 of latches 149, 152 to engage the peripheries of the stop disks and to enter the notches in the disks when the notches come opposite the teeth, by a spring 174 which will be later described in connection with the safety stop.

Above the latches, a stud 156 is fixed to the base and on the stud, bell crank 157 is pivoted. One arm of the bell crank is connected by a link 158 and swiveled fork 159 to fast latch 149. The bell crank bears in a socket in its other arm, a catch 160, urged outwardly by spring 161 until checked by collar 162 pinned to the stem of the catch 160 below the upper arm of the bell crank. A hook 163 shaped complementally to catch 160 is fastened to clutch shifting rod 111 to the rear of dogs 114.

During the retraction of the cutter slide parts are in the position shown in Figs. 10, 11 and 12. Toward the end of the retracting movement tappet 116 strikes forward dog 114 and moves shifting rod 111 forward, and hook 163, engaging catch 160 rotates bell crank 157 counter-clockwise as seen in Fig. 11 through a partial arc of a circle, until, by reason of the angular movement of the catch, it becomes free from the hook. When the bell crank is moved, through link 158, the latches 149, 152 are withdrawn from the notches in stop disks 134 and 139, or 141 in which they rest. For the moment it will be assumed that movable latch 152 is toward the rear end of its shaft and entirely free from the stop-disks so that only the fast latch is operative. This latch being momentarily pulled up, its tooth 151 is freed from the notch 135 in fast stop-disk 134 and the disk, which is being constantly urged to rotate by the friction driver, immediately rotates clockwise as seen in Fig. 12. As soon as the bell crank is freed from hook 163, it and the latch return toward their normal positions under the influence of the spring acting on rod 148, and the lower end of tooth 151 encounters the periphery of disk 134, upon which it rests until the notch again approaches the tooth whereupon the tooth again enters the notch and stops the disk. Rear indexing shaft 122 rotates or stops with the fast disk which is keyed to it and through other gearing which will later be described each time the tooth is removed from the notch in fast disk the gear blank is rotated one space.

Toward the end of the feeding movement of the cutter slide tappet 116 strikes rear dog 114 and moves clutch shifting rod 111 to the rear, causing hook 163 to pass catch 160 which it depresses as it moves past, bringing the hook and catch again into operative relation ready for another indexing action.

The indexing gearing, as will later appear, is preferably provided with change speed elements, which I find it convenient to locate intermediate the indexing mechanism and the gear blank, in order to provide for all possible degrees of indexing movement, but the loose stop disks and movable latch, as will now be shown, provide convenient means for varying the movement of the blank arbor without disturbing the main change speed gearing. For purposes of illustration, it will be assumed that the ratio of gears on shaft 122 and counter-shaft-stud 144 is such that gear 137 rotates at one-quarter the speed of pinion 136. Loose stop disks 139, 141, therefore, rotate with gear 137 once while fast stop disk 134 rotates four times. The disks are originally adjusted so that the notch in disk 139 is in line with notch in disk 134, and one of the notches of disk 141 is in line with the notches in the other disks, the other notch in disk 141 being diametrically opposite the first. Thus, during the indexing rotation of shaft 122, the notch in the first loose disk will coincide with that in the fast disk once in four revolutions, and one of the notches in the second loose disk will coincide with that in the fast disk at every second revolution. In order to obtain a relatively small indexing movement, the movable latch 152 is placed as has been described, free from the loose disks. The fast latch then enters the notch in the fast stop disk at every revolution of the latter. To secure double this indexing movement, thumb screw 154 is loosened and movable latch 152 moved on shaft 148 until it is above the second loose disk 141. Then, at the first revolution of the shaft, tooth 151 of fast latch 149 is opposite its notch and ready to enter, but tooth 155 of the movable latch rests on a portion of the circular periphery of the loose disk, and since the fast latch moves in unison with the movable latch, no tooth is permitted to enter a notch, and the indexing movement continues during another revolution of shaft 122, when the notch 142 in the second loose disk other than the notch which has recently left the tooth of the movable latch, comes in line with the notch in the fast disk, the teeth of both latches enter their notches and indexing is stopped. To secure four times the minimum indexing movement, the latch is shifted on its shaft until it is over the first loose disk. Indexing shaft 122 must then rotate four times before it is stopped in a manner which will be obvious from the foregoing description of the action of the second loose disk.

Obviously, the ratios in gearing between pinion 136 and gear 137 may be varied, the number of loose stop disks may be increased or diminished, and instead of all of the loose stop disks rotating in unison with one gear, such as 137, these loose stop disks may be driven by separate gears at different angular speeds. The different indexing effects obtainable by these variations should be apparent to those versed in the art, without further detailed description.

*Safety-stop.*—It has been found that unless means are taken to prevent it, the cutter slide is sometimes fed toward the blank before the indexing movement is completed, resulting in spoiling the blank. The safety-stop, which is to be described, is provided to prevent this occurrence.

Referring to Figs. 1 and 14—reversing lever 97 has an arm 170 extending to the right of its fulcrum. Below the end of this arm the safety-stop, consisting of a rod 171, is reciprocably mounted in the base. The rod carries an arm 172 pinned to it normally resting on support 173, and urged downward by a spring 174 which is confined between the feed-box 6 and the arm. Latch rod 148 is mounted at its forward end in a bearing 175 and carries a two-armed lever or bell crank 176 which is keyed to the shaft. The end of arm 177 of this bell crank engages the lower face of arm 172 on the safety-stop lying between two projections 178, which prevent disengagement of the arms. It now becomes evident that spring 174 is the agent which tends to rotate rock shaft 148 in the manner before described in connection with the indexing mechanism. As clutch shifting rod 111 commences to be moved forward by the slide as the cutter approaches the end of its retracting movement, rear lug 112 on the front end of the rod engages lug 113 depending from rocker 102 and moves the rocker forward until cam-follower 105 passes the crest of cam 106. At this moment the cam commences to urge the follower farther forward until its lug 103 contacts with the corresponding lug on the reversing lever and the action of the cam then tends to urge the reversing lever to move reversing clutch 95 into engagement with feed-clutch member 63. The forward movement of shifting rod 111 has, however, at the same time rotated bell crank 157, retracted the latch or latches from the notches in the stop disks, and permitted the indexing movement to commence. In moving up from the notches, the latch or latches rotate rock shaft 148 as has been described and this rotation of the shaft throws up arm 177 of bell crank 176, which in turn raises arm 172 and the safety-stop 171 against the action of spring 174, so that the upper end of the safety-stop projects in the path of the end of arm 170 of the reversing lever. The safety-stop is in such a position that it checks arm 170, and therefore the reversing lever, before the teeth of reversing clutch 95 encounter the teeth of feed clutch member 63. The conditions now are as follows: The cam urges the reversing lever and reversing clutch in the feeding direction; the safety-stop is in the path of lever arm 170 and prevents movement of the lever to feeding position; the safety-stop is held in this active position by rock shaft 148 and the rock shaft is held in the described position against the action of spring 174 by contact of the ends of the teeth of the latches (or one of them as the case may be) engaging the circular peripheries of their corresponding indexing disk or disks. It is, therefore, obvious that it is impossible for the cutter slide to be fed forward toward the blank while indexing is in progress. As soon as the determined indexing movement is completed, the teeth of the latch or latches enter their notches, rock shaft 148 is permitted to rotate, safety-stop 171 drops under influence of its spring and gravity, freeing arm 170 of the reversing lever, and the lever under influence of the cam completes its movement, bringing the reversing clutch into engagement with feed clutch member 63. The slide and cutter are then fed to and through the blank, the reversing lever and clutch are thrown to retracting position by rearward movement of shifting rod 113 in obvious manner and the sequence of actions continues until the blank is finished. The considerable clearance between lugs 112, which act on the reversing lever, serves to permit return of the shifting rod to its normal position after it has thrown the cam-follower in front of the crest of the cam and before the lever is returned to the retracting position.

*Blank arbor, mounting and gearing.*—The manner in which driven indexing shaft 122 is impelled has been described. At the rear end of the machine a cylindrical bearing member 180 is bolted to the base providing at its rear end a bearing 181 for the rear end of the shaft 122. Gear 182 is keyed and bolted to the rear end of shaft 122. A bracket 183 bolted to the base above shaft 122 carries indexing countershaft 184 which has gear 185 keyed and bolted to its rear end. A tubular bearing member 186 revolubly mounted on cylindrical bearing 180 forms the hub of a quadrant which has a slotted arm 187 secured in adjusted position by a set screw 188 passing through the slot and engaging a projection 189 on bearing 180. Another arm 190 carried by tubular bearing 186 at its rear end is provided with a radial slot 191 having an inwardly projecting flange 192. Stud 193 has a flange 194 resting against the outer face of arm 190 and a nut 195 screwed on the inner end of stud 193 and having a flanged head engaging flange 192 clamps flange 194 upon arm 190 and so holds stud 193 in position adjustably toward and from the center of shaft 122. The stud carries a sleeve 196 to which a pinion 197 engaging gear 182 and pinion 198 engaging gear 185, separated by washer 199, are keyed and held against endwise displacement by washer and nut 200 screwed on the rear end of stud 193.

The gearing just described provides means additional to the adjustable latch mechanism described in connection with the indexing mechanism for varying the speed of rotation of the blank arbor in relation to the speed of its driving member. The ratio of movement of shaft 184 to that of shaft 122 may be changed by removing pinion 198 and gear 185 and replacing them with geared members of different sizes, quadrant 186 being shifted angularly to bring said gears into proper engagement. In making this gear change no alteration of the position of stud 193 is necessary since pinion 197 remains in proper engagement with gear 182 as the quadrant is moved. To effect changes in the gear ratio beyond the range permitted by changing the two gears mentioned, gear 182 and pinion 197 may also be changed, the stud carrying the pinion being adjusted in its slot to bring the new pinion 197 into proper engagement with gear 182. Either or both of these changes may be made at the same time and evidently a very wide variation in speeds may be obtained by this change speed gearing proper, and this range is further increased by the varying indexing movement secured by the adjustable latch mechanism.

Indexing countershaft 184 carries a bevel gear 201 which engages a similar gear 202. The bevel gears are inclosed in a gear box 204 which is mounted to swing in relation to shaft 184 and the machine by means of sleeves 205 which extend from the box to the front and rear and also provide bearings for the shaft. The sleeves are in turn mounted in the arms of bracket 183 which rest against the hub of the gear box and prevent it from longitudinal movement. Gear box 204 also has an upwardly projecting sleeve 206 in which is revolubly mounted a spindle 207 which has a flange 208 resting upon the upper end of the sleeve. The lower end of the spindle is formed into a stud 209 to which bevel gear 202 is pinned.

Numeral 210 designates the indexing worm shaft, the lower end of which rests in the bore of spindle 207. The spindle is split for a distance at the upper end and by means of a nut 211 may be constricted upon the worm shaft. The shaft is provided with a knurled flange 212 by which it may be rotated when nut 211 is loosened to adjust the angular position of the blank arbor without rotating shaft 184 or other driving parts.

The blank arbor carrier or saddle 213 has flanges 214, 215, engaging the rear and front edges of guide rails 216, 217, on blank column 2. The saddle is also provided with an adjustable gib 218 held in position by a flange 219. Clamps 220 are secured to the saddle by set screws 221 and engage the guide rails, preventing the saddle from moving away from the column. The saddle also has a lug 222 movable within recess 223 formed in the column and internally screw-threaded to form a nut engaged by screw 224 provided with hand wheel 225 by which the spindle is raised and lowered on the column. When the saddle is properly adjusted vertically it is prevented from movement by tightening screws 221ª which pass through the saddle from the left side (see Fig. 8) and engage clamps 220, thereby causing the clamps to engage the guide rails.

Sleeve 225ª forming a part of the saddle carries the arbor-spindle 226 revolubly in bearing sleeves 227, 228. The spindle is tapered at its forward end, bearing sleeve 228 being correspondingly tapered to receive it, and the spindle is adjusted for wear by means of nuts 229 screw-threaded on the spindle and resting against the rear flange of bearing member 227. Spindle 226 is bored all the way through and has a conical counter-bore 230 on its forward end in which the tapered end of the work-arbor 231 rests. The arbor is secured in the spindle by screw 232 which has a flange 233 resting against the rear end of the spindle and the hand wheel 234 by which it is set up. The indexing worm-wheel 235 is secured to the tapered end 236 of the spindle by a key and nut 237. This nut also has an inwardly extending flange 238 resting against the rear face of flange 233 on screw 232. This serves to take up the reaction of flange 233 when screw 232 is rotated left-handedly to free the arbor from the spindle.

Worm-shaft 210 has a longitudinal keyway and carries indexing worm 239 which has an internal spline engaging the keyway so that it is movable longitudinally on the shaft but rotates with it. The worm engages worm-wheel 235 and when driven index-shaft 122 rotates, the worm is rotated and revolves the blank arbor in a manner which will be understood from the foregoing description of the parts.

It is desirable to provide ready means for freeing the worm from the worm-wheel so that the blank may be rotated through considerable arcs without the trouble of moving all of the indexing mechanism and also so that the angular position of the worm-wheel may be shifted in relation to the worm one tooth space or more, as may be desired. For this purpose saddle 213 carries a bracket 240 slotted at 241. A rectangular trunnion-block 242 mounted in the slot has an outer flange 243 engaging the forward face of the bracket. The block also has an arm 244 extending to the right hand end of the bracket where it is slotted at 245. In slot 245 rests a flanged nut 246 through which passes a screw 247 of which the inner end is secured in the bracket. Worm housing 248 has a trunnion 249 entering the bore in the trunnion block and a flange 250 engaging the rear face of bracket 240. A screw 251, nut 252 and washer 253 serve to draw flanges 250 and 243 together upon the bracket when desired. The worm housing surrounds the worm and at its lower end is formed into a sleeve 254 forming a bearing for the worm shaft and at its upper to another sleeve 255 in which is inserted a bush 256 forming an upper bearing for the worm-shaft. The inner end of the sleeve rests against the worm, and screws 257 passing through flange 258 on the bearing sleeve and engaging the housing serve to urge the bearing sleeve against the worm and hold the latter securely against longitudinal movement in the housing.

To free the worm from the worm-wheel, supposing the parts to be in the position shown, nut 252 is loosened, freeing flanges 243 and 250 from the bracket and nut 246 is rotated so as to draw trunnion block 242 and with it housing 248 and the worm away from the worm-wheel until the threads of the worm are freed from the teeth of the gear. During this movement the trunnion rotates slightly in its block and the necessary movement of the worm-shaft around the center of shaft 184 is permitted by rotation of the sleeves 205 of gear box 204 in brackets 183 and on shaft 184. The blank arbor may now be freely turned to the desired position. Reverse movement of nut 246 brings the worm again in engagement with the worm-wheel, movement of the trunnion-block and other parts being stopped at an adjustable point by screw 259 passing through arm 244 encountering the end of bracket 240. Lock nut 260 secures the screw in adjusted position.

It is necessary in adjusting the cutter slide frequently to rotate the feed screw by hand. This I conveniently do by means of a crank applied to the forward end of the screw. It is highly important, to permit easy reversing of the screw, to keep its moment of inertia as low as possible and for this reason I provide a crank normally free on the shaft as will now be described.

$59^a$ is the crank arm whose hub $59^b$ is revolubly mounted on the end of feed-shaft 59. To the rear of the hub a circular ratchet $59^c$ is keyed to the shaft. Crank arm $59^a$ carries a lug $59^d$ through which plunger $59^e$ passes. The plunger has at its inner end a tooth $59^f$ adapted to engage the ratchet and at its outer end a collar $59^g$ urged outwardly by a spring $59^h$ confined between the collar and the lug. The outer end of the crank arm is forked and the handle $59^i$ is pivoted in the fork. At the inner end the handle has a projection $59^k$ overlying the end of plunger $59^e$. Normally, tooth $59^f$ is free from the ratchet and the crank simply hangs from the shaft which rotates freely within the crank hub. In order to rotate the shaft by hand, handle $59^i$ is urged outwardly which brings the tooth into engagement with the ratchet and the crank being then rotated the shaft and the feed screw is revolved as desired. As soon as the handle is released the parts return to normal disengaged position.

I claim:

1. In a machine tool, a tool-slide, a feed-shaft carrying a screw engaging the slide, a drive-shaft in transverse relation to the feed-shaft, a worm-wheel revoluble on the feed-shaft, a worm-shaft parallel with the drive-shaft carrying a worm engaging the worm-wheel, changeable-gears connecting the drive-shaft and worm-shaft, a retracting-gear revoluble on the feed-shaft, an intermediate shaft connected with the drive-shaft by bevel-gears, and gearing connecting the retracting-gear with the intermediate shaft.

2. In a machine tool, a tool-slide, a feed-shaft carrying a screw engaging the slide, a drive-shaft in transverse relation to the feed-shaft, a worm-wheel revoluble on the feed-shaft, a worm-shaft parallel with the drive-shaft carrying a worm engaging the worm-wheel, changeable-gears connecting the drive-shaft and worm-shaft, a retracting-gear revoluble on the feed-shaft, an intermediate shaft connected with the drive-shaft by bevel-gears, gearing connecting the retracting-gear with the intermediate shaft, clutch-members for the worm-wheel and retracting-gear, and a sliding clutch-member revolubly connected with the feed-shaft adapted to engage the worm-wheel or retracting-gear clutch-members.

3. In a machine tool, a tool-slide, a rotary tool thereon, a feed-shaft carrying a screw engaging the slide, a drive-shaft in transverse relation to the feed-shaft, a worm-wheel revoluble on the feed-shaft, a worm-shaft parallel with the drive-shaft carrying a worm engaging the worm-wheel, changeable-gears connecting the drive-shaft and worm-shaft, a retracting-gear revoluble on the feed-shaft, an intermediate shaft connected with the drive-shaft by bevel-gears, gearing connecting the retracting-gear with the intermediate shaft, a tool-drive shaft parallel to the feed-shaft connected to rotate the tool and permit movement of the slide, and gearing connecting the tool-drive shaft with the intermediate shaft.

4. In a machine tool, a tool-slide, a rotary tool thereon, a feed-shaft carrying a screw engaging the slide, a drive-shaft in transverse relation to the feed-shaft, a worm-wheel revoluble on the feed-shaft, a worm-shaft parallel with the drive-shaft carrying a worm engaging the worm-wheel, changeable-gears connecting the drive-shaft and worm-shaft, a retracting-gear revoluble on the feed-shaft, an intermediate shaft connected with the drive-shaft by bevel-gears, gearing connecting the retracting-gear with the intermediate shaft, a tool-drive shaft parallel to the feed-shaft connected to rotate the tool and permit movement of the slide, gearing connecting the tool-drive shaft with the intermediate shaft, an index-drive-shaft parallel with the feed-shaft, and gearing connecting the index-drive-shaft with the intermediate shaft.

5. The combination of a tool slide, reversible driving means therefor, a lever controlling said driving means, a rocker movably mounted in relation to the lever, a tappet rod connected to the rocker and adapted to be moved by the slide, indexing mechanism comprising a driven disk provided with a notch, a dog adapted to engage the notch, a bell crank connecting the dog operatively with the tappet rod, a safety stop coöperating with the lever, and a connection between the safety stop and the dog.

6. In a gear cutter or similar machine, the combination of a feed box, a reversing lever therein, a safety stop adapted to engage the lever, a spring urging the stop to disengagement, a rock shaft having an arm engaging the stop for actuating the same, a cutter slide controlled by said lever, indexing mechanism comprising a driven disk having a notch, a dog mounted on the rock shaft and adapted to engage the notch, and operative connections between the cutter slide and the dog.

ARISTIDES REYNOLDS MURRAY.

Witnesses:
W. J. FOSTER,
J. F. BOWMAN.

---

Copies of this patent may be obtained for five cents each, by addressing the "Commissioner of Patents, Washington, D. C."